United States Patent

(12) United States Patent
Lee et al.

(10) Patent No.: US 9,047,748 B2
(45) Date of Patent: Jun. 2, 2015

(54) SAFETY GUARD DEVICE AND METHOD FOR DETECTING FALLING OBJECT

(71) Applicant: Zhongshan Innocloud Intellectual Property Services Co., Ltd., New Taipei (TW)

(72) Inventors: Hou-Hsien Lee, New Taipei (TW); Chang-Jung Lee, New Taipei (TW); Chih-Ping Lo, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 314 days.

(21) Appl. No.: 13/686,955

(22) Filed: Nov. 28, 2012

(65) Prior Publication Data

US 2013/0286197 A1  Oct. 31, 2013

(30) Foreign Application Priority Data

Apr. 27, 2012 (TW) .................................. 101115176

(51) Int. Cl.
*H04N 7/18* (2006.01)
*G08B 21/02* (2006.01)
*G06K 9/32* (2006.01)
*A42B 3/04* (2006.01)

(52) U.S. Cl.
CPC *G08B 21/02* (2013.01); *H04N 7/18* (2013.01); *G06K 2009/3291* (2013.01); *A42B 3/046* (2013.01)

(58) Field of Classification Search
CPC ......... H04N 7/18; H04N 7/181; H04N 7/183; H04N 7/188; G08B 21/02; G08B 21/0266; G08B 21/0272; G08B 21/0261; G08B 21/0222; G08B 21/0476; G08B 21/22; G08B 13/19656
USPC ............... 348/135, 142–144; 340/573.1, 500, 340/539.22, 539.23, 539.25, 539.15
See application file for complete search history.

(56) References Cited

U.S. PATENT DOCUMENTS

2011/0231145 A1   9/2011 Chen
2013/0169785 A1*  7/2013 Matthews ...................... 348/77

FOREIGN PATENT DOCUMENTS

EP          0445334 A1      3/1990

* cited by examiner

*Primary Examiner* — Sherrie Hsia
(74) *Attorney, Agent, or Firm* — Novak Druce Connolly Bove + Quigg LLP

(57) ABSTRACT

In a method for detecting a falling object using a safety guard device, a current digital image of the overhead scene is captured by an image capturing device of the safety guard device. The method detects a falling object in the current digital image, and outputs alarm messages when a falling object is detected in the current digital image and the falling object is going to hit a user of the safety guard device.

18 Claims, 10 Drawing Sheets

SAFETY GUARD DEVICE AND METHOD FOR DETECTING FALLING OBJECT

BACKGROUND

1. Technical Field

Embodiments of the present disclosure relate to safety technology, and particularly to a safety guard device and method for detecting a falling object using the safety guard device.

2. Description of Related Art

Safety guard devices (e.g., safety helmets) are used to protect a construction worker on a construction site. However, safety guard devices cannot detect whether a falling object is going to hit the construction worker. If the falling object is very heavy and the construction worker does not move from underneath the object, injury may occur. Therefore, an efficient method for detecting a falling object using a safety guard device is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
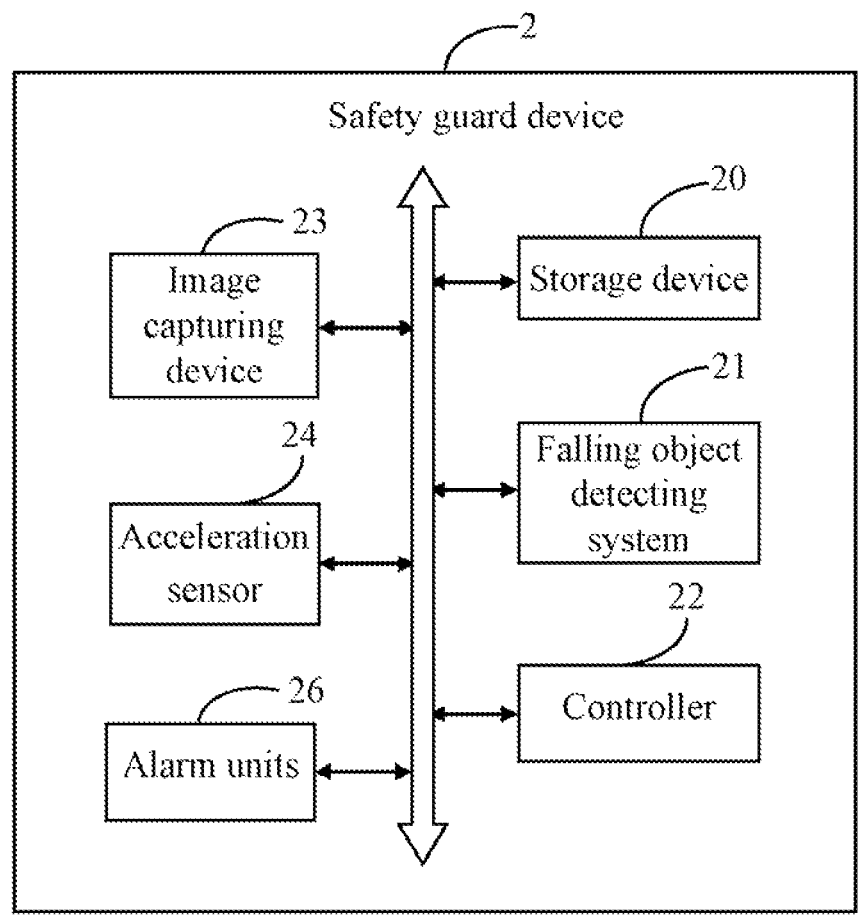
FIG. 1 is a schematic diagram of one embodiment of a safety guard device including a falling object detecting system.

FIG. 1 is a block diagram of one embodiment of a safety guard device 2 including a falling object detecting system 21. The safety guard device 2 further includes a storage device 20, a controller (e.g., a processor) 22, an image capturing device 23, an acceleration sensor 24, and one or more alarm units 26. It should be understood that FIG. 1 illustrates only one example of the safety guard device 2 that may include more or fewer components than illustrated, or a different configuration of the various components in other embodiments. For example, the safety guard device 2 may further include a driving unit (e.g., a motor) and a power supply (e.g., a battery). The driving unit is used to start up the alarm units 26. The power supply is used to provide power to the safety guard device 2.

Figure 4:
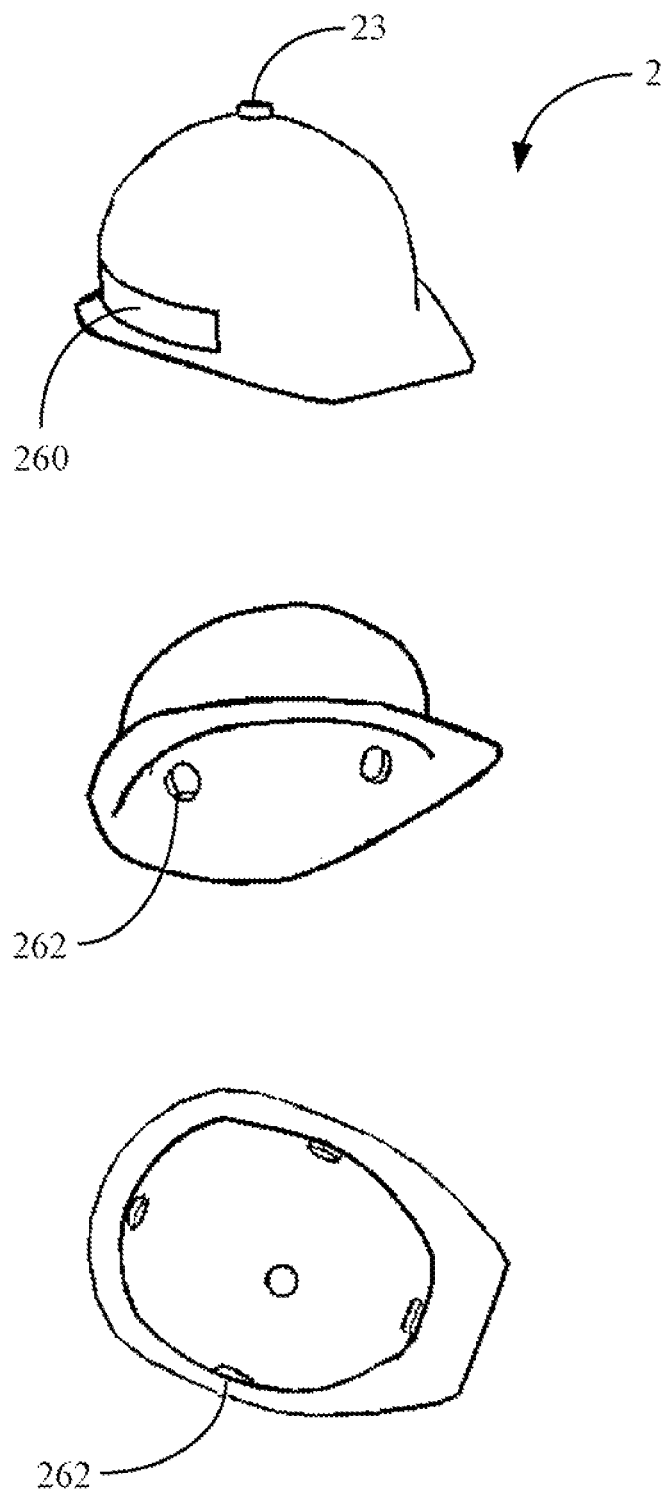
FIG. 4 is a schematic diagram of an example of the safety guard device.

In one embodiment, the safety guard device 2 may be a safety helmet. As shown in FIG. 4, the image capturing device 23 is positioned on top of the safety guard device 2. The alarm units 26 include a signal lamp 260 and one or more vibrating components 262. The signal lamp 260 is positioned on an outside part of the safety guard device 2, while the vibrating components 262 are positioned on an inside part of the safety guard device 2. In other embodiments, the alarm units 26 may be positioned elsewhere (e.g., in the front part) of the safety guard device 2.

In one embodiment, the image capturing device 23 may be a depth-sensing camera, such as a time-of-flight (TOF) camera. In this embodiment, the image capturing device 23 is a camera system that captures a distance from a target object in a scene being captured to a lens of the image capturing device 23 (distance information) using the TOF principle, which can obtain a distance between the lens and each point on the target object which has been captured. Thus, each image captured by the image capturing device 23 includes distance information between the lens and each point on the target object in the image.

In one embodiment, the image capturing device 23 obtains a digital image of the area overhead the safety guard device 2 and stores the digital image in the storage device 20. The falling object detecting system 21 detects a falling object in the digital image, and outputs alarm messages by enabling the alarm units 26 when the possibility of a detected falling object hitting a user of the safety guard device 2 is found to exist.

In one embodiment, the storage device 20 may be a smart media card, a secure digital card, a compact flash card, or any other memory storage device. The acceleration sensor 24 is used to detect a movement direction and a movement speed of the user of the safety guard device 2.

The falling object detecting system 21 receives a digital image captured by the image capturing device 23, detects a falling object in the digital image, and outputs the alarm messages by using the signal lamp 260 or the vibrating components 262 when a detected falling object hitting the user of the safety guard device 2 is deemed possible. In one embodiment, the falling object detecting system 21 may include computerized instructions in the form of one or more programs that are executed by the controller 22 and stored in the storage device 20 (or memory). A detailed description of the falling object detecting system 21 will be given in the following paragraphs.

Figure 2:
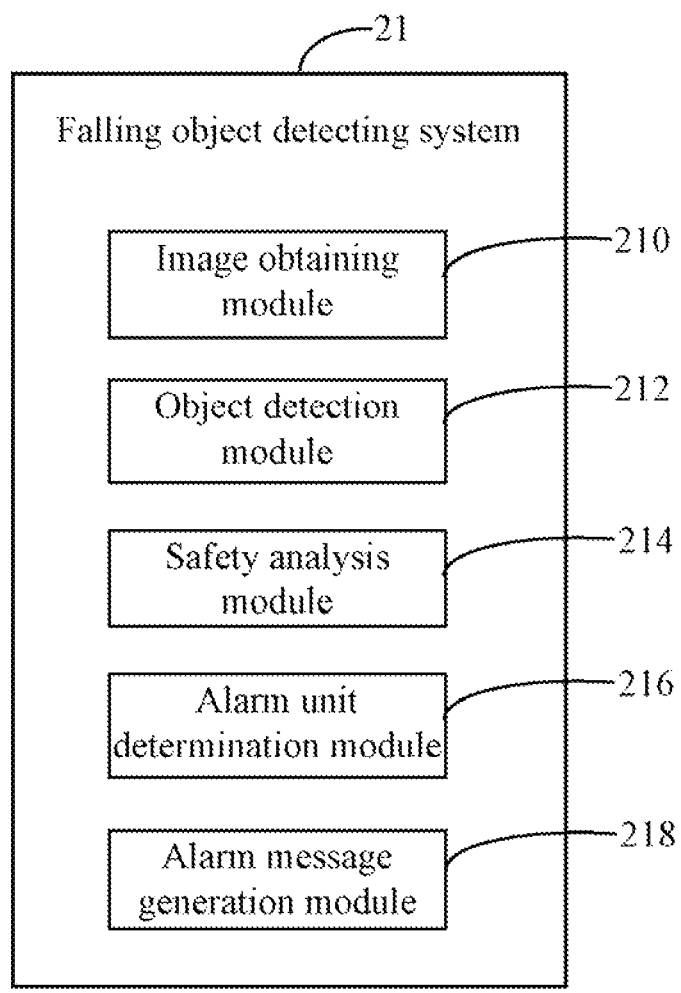
FIG. 2 is a schematic diagram of function modules of the falling object detecting system included in the safety guard device.

FIG. 2 is a block diagram of function modules of the falling object detecting system 21 included in the safety guard device 2. In one embodiment, the falling object detecting system 21 may include one or more modules, for example, an image obtaining module 210, an object detection module 212, a safety analysis module 214, an alarm unit determination module 216, and an alarm message generation module 218. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
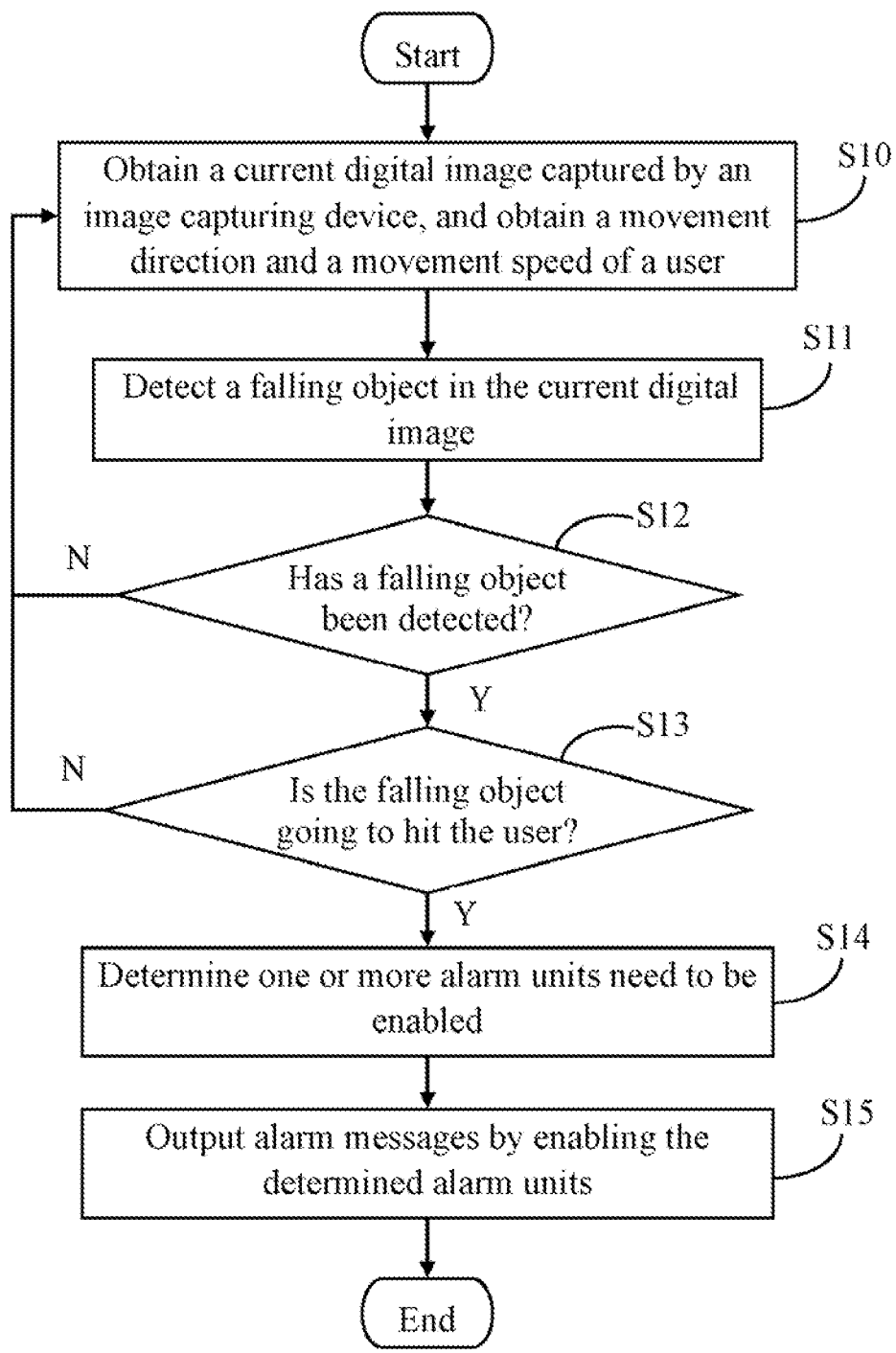
FIG. 3 is a flowchart of one embodiment of a method for detecting a falling object using the safety guard device.

FIG. 3 is a flowchart of one embodiment of a method for detecting a falling object using the safety guard device 2. Depending on the embodiment, additional steps may be added, others removed, and the ordering of the steps may be changed.

In block S10, the image obtaining module 210 obtains a current digital image captured by the image capturing device 23 positioned on the top of the safety guard device 2 at preset time intervals (e.g., one second), and obtains a movement direction and a movement speed of the user of the safety guard device 2 as detected by the acceleration sensor 24.

In block S11, the object detection module 212 detects a falling object in the current digital image. A detailed description is provided as follows.

The object detection module 212 obtains a previous digital image captured by the image capturing device 23, compares a distance (current distance) of each point in the current digital image (e.g., the distance between each point in the current digital image and the lens of the image capturing device 23) with a distance (previous distance) of each point (each point being as far as possible a corresponding point) in the previous digital image (e.g., the distance between each point in the previous digital image and the lens of the image capturing device 23), and determines whether the current distance is less than the previous distance. If a specified number (e.g., one hundred) of points whose current distances are less than the previous distances are found, the object detection module 212 determines that the current digital image includes a falling object. It is represented that a falling object occurs on top of the safety guard device 2. In one embodiment, the falling object is determined by calculating a smallest rectangle framing the specified number of points, or determined by fitting the specified number of points into a fitted figure using a feature point fitting method.

Figure 5:
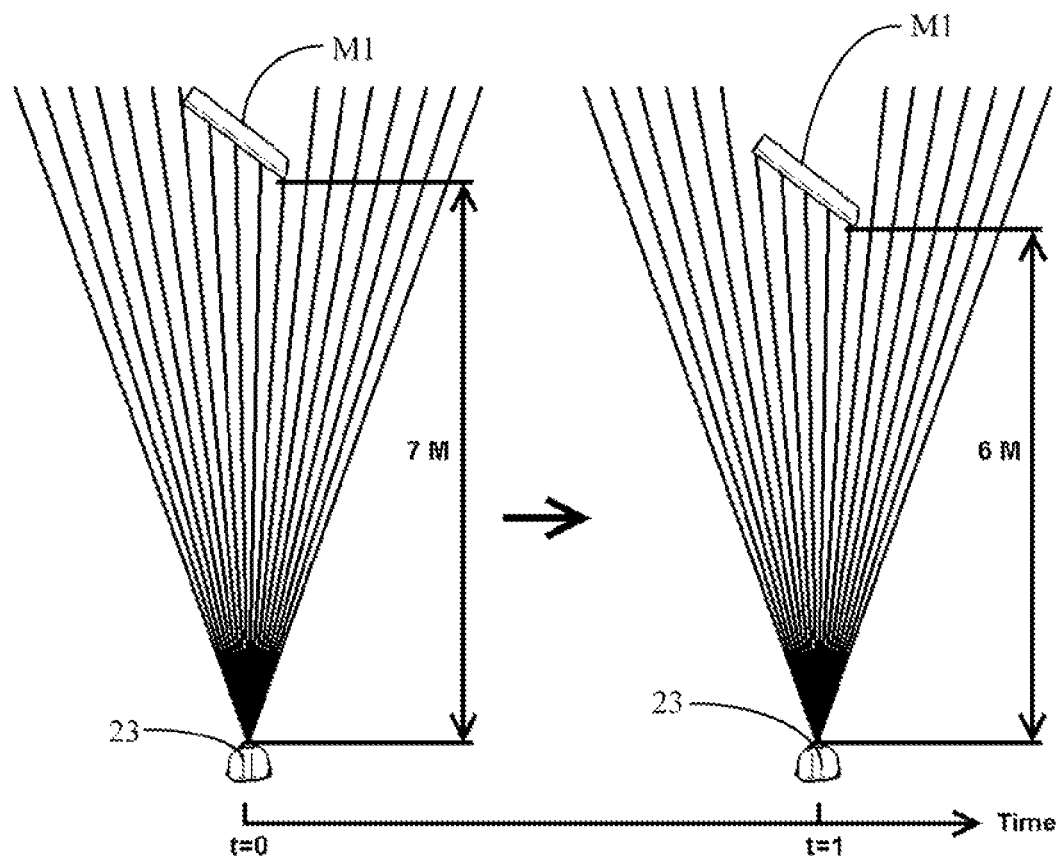
FIG. 5 shows an example of detecting a falling object in a digital image captured by an image capturing device positioned on the safety guard device.

For example, as shown in FIG. 5, the current digital image is captured at time t=1, the previous digital image is captured at time t=0, and "M1" represents the falling object detected by the object detection module 212. The distance of the falling object "M1" to the lens of the image capturing device 23 is reduced, to six meters instead of seven meters. In one embodiment, the distance of the falling object "M1" is determined as a minimum distance between each point of the falling object "M1" and the lens of the image capturing device 23, or may be determined as a distance between a midpoint of the falling object "M1" and the lens of the image capturing device 23. The midpoint of the falling object "M1" may be a center of the smallest rectangle corresponding to the falling object "M1".

In other embodiments, the falling object may be detected using a moving object detection method, the detected moving object is determined as the falling object in the current digital image.

In block S12, the object detection module 212 determines whether a falling object has been detected in the current digital image. If a falling object has been detected in the current digital image, the procedure goes to block S13. If a falling object is not detected in the current digital image, the procedure returns to block S10.

In block S13, the safety analysis module 214 determines whether the detected falling object is going to hit the user of the safety guard device 2 according to a position of the detected falling object, and the movement direction and the movement speed of the user. If the detected falling object is going to hit the user (i.e., the detected falling object is in proximity to the safety guard device 2), the procedure goes to block S14. If the detected falling object is not going to hit the user (i.e., the detected falling object is not in proximity to the safety guard device 2), the procedure returns to block S10. In this embodiment, two methods for determining whether the detected falling object is going to hit the user are described as follows.

Figure 6A:
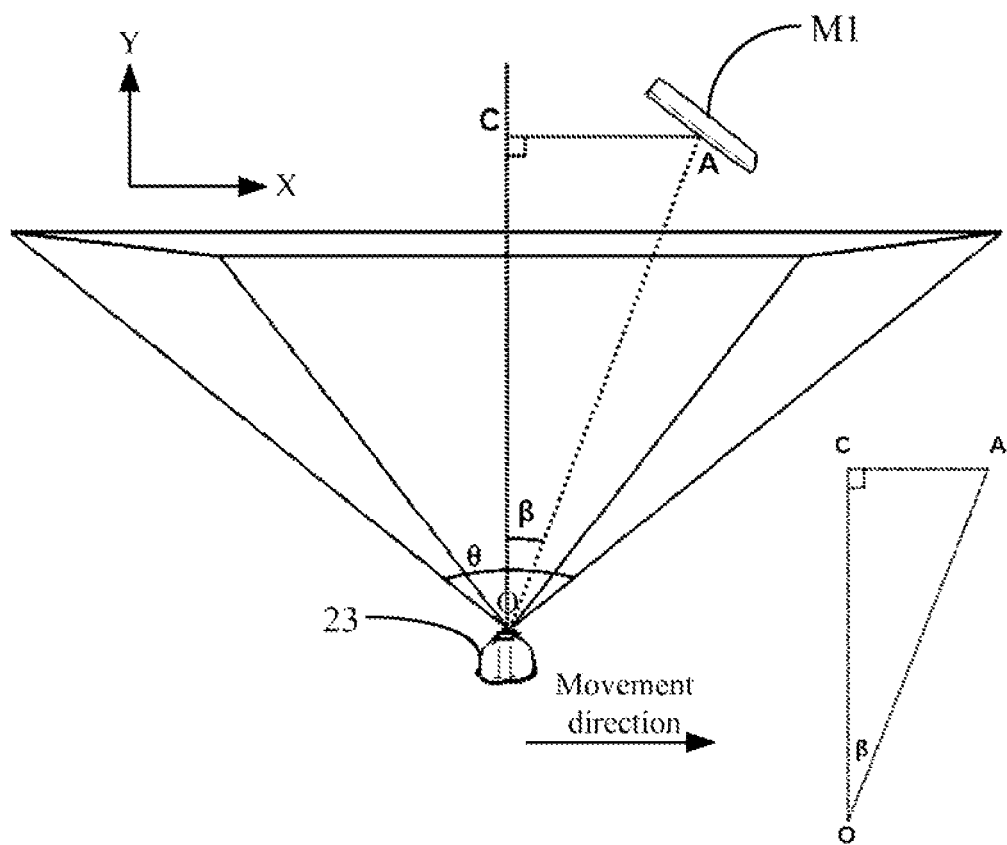
FIGS. 6A-6B are schematic diagrams of examples for calculating a falling distance from a detected falling object to the safety guard device.

In a first determining method, the safety analysis module 214 calculates a falling distance from the detected falling object to the safety guard device 2 according to the distance between the detected falling object and the lens of the image capturing device 23. As shown in FIG. 6A, suppose that point "A" represents the midpoint of the detected falling object "M1", point "O" represents a position of the lens of the image capturing device 23, "OA" represents the distance between the detected falling object "M1" and the lens of the image capturing device 23, "OC" represents the falling distance needs to be calculated, and "CA" represents the horizontal distance between the user of the safety guard device 2 and the detected falling object "M1" along a horizontal direction. For example, the horizontal direction may be determined to be the movement direction of the user.

Figure 6B:
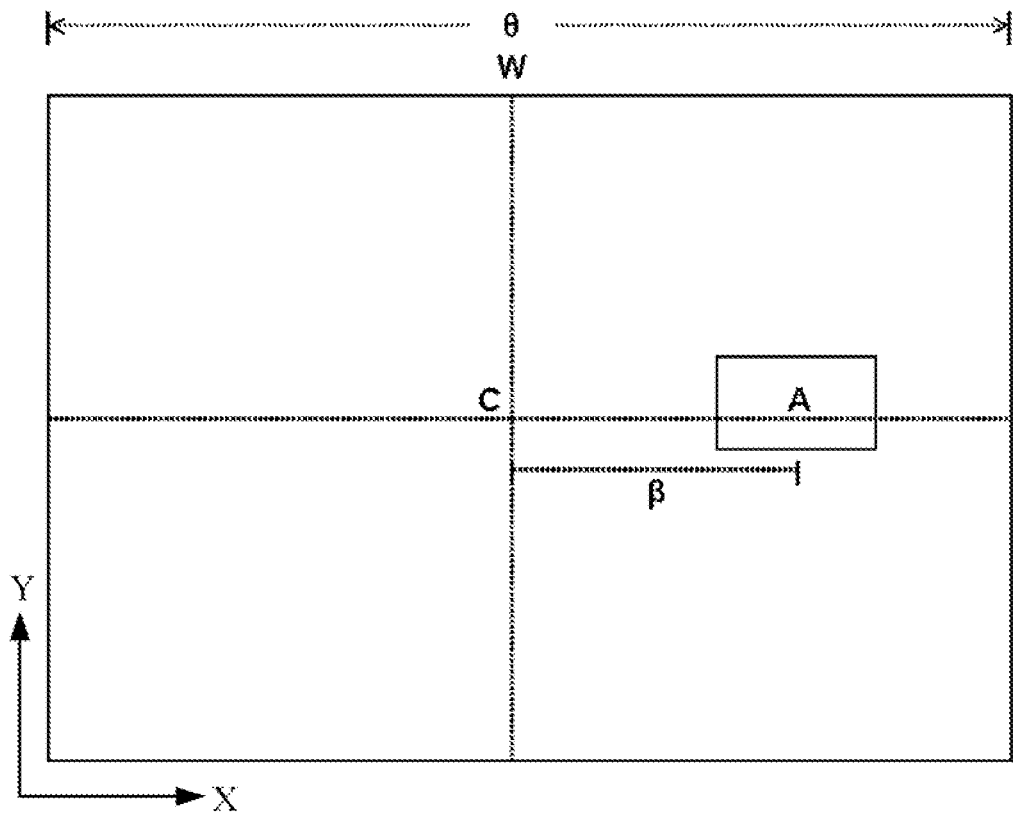

As shown in FIG. 6A, the distance "OA" is a known value, the angle AOC($\beta$) may be determined according to a ratio between a length of "CA" in the current digital image and a width of the current digital image. Referring to FIG. 6B, "W" represents the width of the current digital image, "$\theta$" represents a fixed capture angle of the image capturing device 23, $\beta=\theta \times X1/W$, where "X1" represents the length of "CA" in the current digital image, the length of "CA" in the current digital image is determined as an X-axis coordinate of the point "A" in the current digital image, and point "C" represents an origin of a coordinate system of the current digital image.

After the angle "$\beta$" is determined, the falling distance "OC" may be calculated by a formula of "OC=OA×cos($\beta$)", where cos( ) is a cosine function. The horizontal distance "CA" between the user of the safety guard device 2 and the detected falling object "M1" is calculated by a formula of "OC=OA×sin($\beta$)", where sin( ) is a sine function.

Figure 6C:
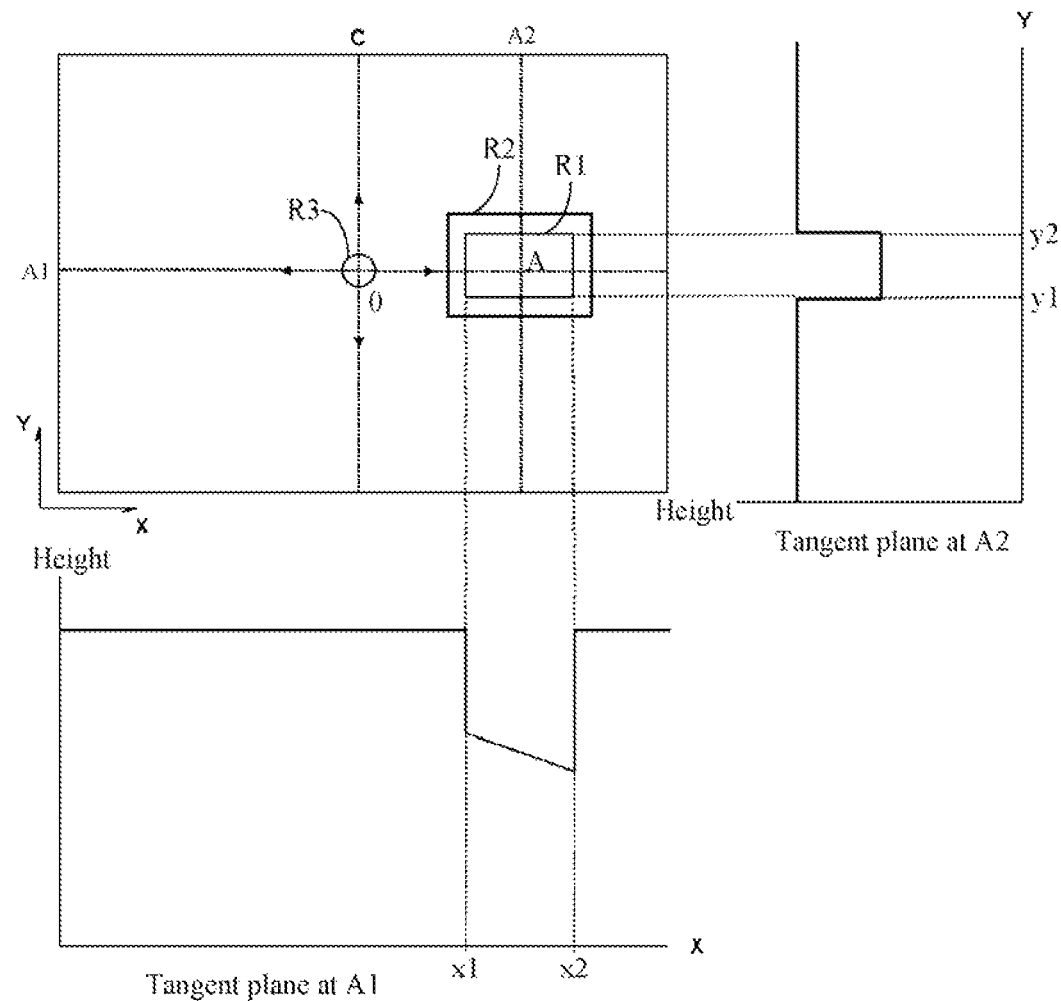
FIG. 6C is a schematic diagrams of an example for determining a falling range of the detected falling object.

When the falling distance "OC" is calculated, the safety analysis module 214 determines a falling range of the detected falling object "M1" according to the falling distance "OC". In one embodiment, the falling range is an area within which the detected falling object "M1" will fall, for example, the falling range may include a horizontal coordinate range and a vertical coordinate range of the detected falling object "M1". The horizontal coordinate range of the detected falling object "M1" is determined by calculating a horizontal tangent plane of the current digital image along a horizontal axis (e.g., the X-axis) of the current digital image according to a current height of the detected falling object "M1", the current height of the detected falling object "M1" is determined to be the falling distance of the falling object "M1". The vertical coordinate range of the detected falling object "M1" is determined by calculating a vertical tangent plane of the current digital image along a vertical axis (e.g., the Y-axis) of the current digital image according to the current height of the detected falling object "M1". For example, as shown in FIG. 6C, the horizontal coordinate range of the detected falling object "M1" is [x1, x2], and the vertical coordinate range of the detected falling object "M1" is [y1, y2].

When the falling range of the detected falling object "M1" has been determined, the safety analysis module 214 determines an alarm range according to the falling range of the detected falling object "M1", and determines a user path or area comprising a number of possible paths (user range) according to a current position of the user. If the user range and the alarm range have at least one intersection point, the safety analysis module 214 determines that the detected falling object "M1" is going to hit the user of the safety guard device 2, and alarm messages may be outputted by the alarm message generation module 218. If the user range and the alarm range have no intersection point, the safety analysis module 214 determines that the detected falling object "M1" is not going to hit the user of the safety guard device 2.

In one embodiment, the alarm range is a first closed figure (e.g., a rectangle of a proportional size approximately 50 percent larger than the falling range) framing the falling range of the detected falling object "M1", the user range is a second closed figure (e.g., a circle) determined by the current position of the user. For example, as shown in FIG. 6C, "R1" represents the falling range of the detected falling object "M1", "R2" represents the alarm range, and "R3" represents the user range.

In a second determining method, the safety analysis module 214 calculates a falling distance "L" from the detected falling object "M1" to the safety guard device 2, and calculates a horizontal distance "D1" between the user of the safety guard device 2 and the detected falling object "M1" along the horizontal direction (i.e., the movement direction of the user) according to the distance between the detected falling object "M1" and the lens of the image capturing device 23, the detailed description refers to the above description in the first determining method.

The safety analysis module 214 calculates a falling time "T" of the detected falling object "M1" according to the falling distance "L" of the detected falling object "M1". For example, the falling time "T" may be calculated using the formula: $h=gt^2/2$, where "h" represents the falling distance "L" (i.e., h=L), "t" represents the falling time, "T" needs to be calculated, and "g" represents acceleration due to gravity (e.g., $g=9.8$ m/s$^2$).

The safety analysis module 214 determines a movement distance "D2" of the user within the falling time "T" according to the movement speed of the user. If the movement distance "D2" plus a preset value "P" is greater than the horizontal distance "D1" between the user and the detected falling object "M1" (i.e., D2+P>D1), the safety analysis module 214 determines that the detected falling object "M1" is going to hit the user of the safety guard device 2.

Figure 7A:
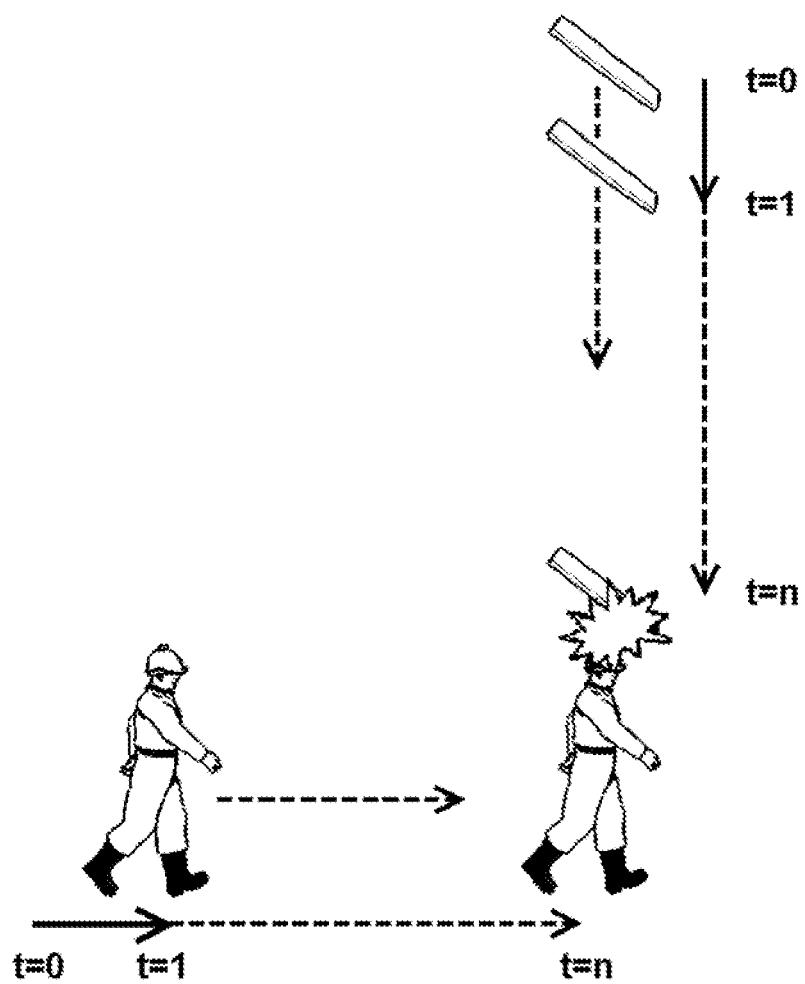
FIG. 7A-7B are schematic diagrams of examples for outputting alarm messages when the detected falling object is going to hit a user of the safety guard device.

In block S14, the alarm unit determination module 216 determines one or more alarm units 26 which need to be enabled according to a relative position between the user of the safety guard device 2 and the detected falling object "M1". For example, if the position of the detected falling object "M1" is located in front of the user (refers to FIG. 7A), the alarm unit determination module 216 determines that the vibrating components 262 positioned in the front of the safety guard device 2 and/or the signal lamp 260 need to be enabled. In other embodiments, block S14 may be removed, the alarm units 26 may be enabled directly when the detected falling object is going to hit the user.

Figure 7B:
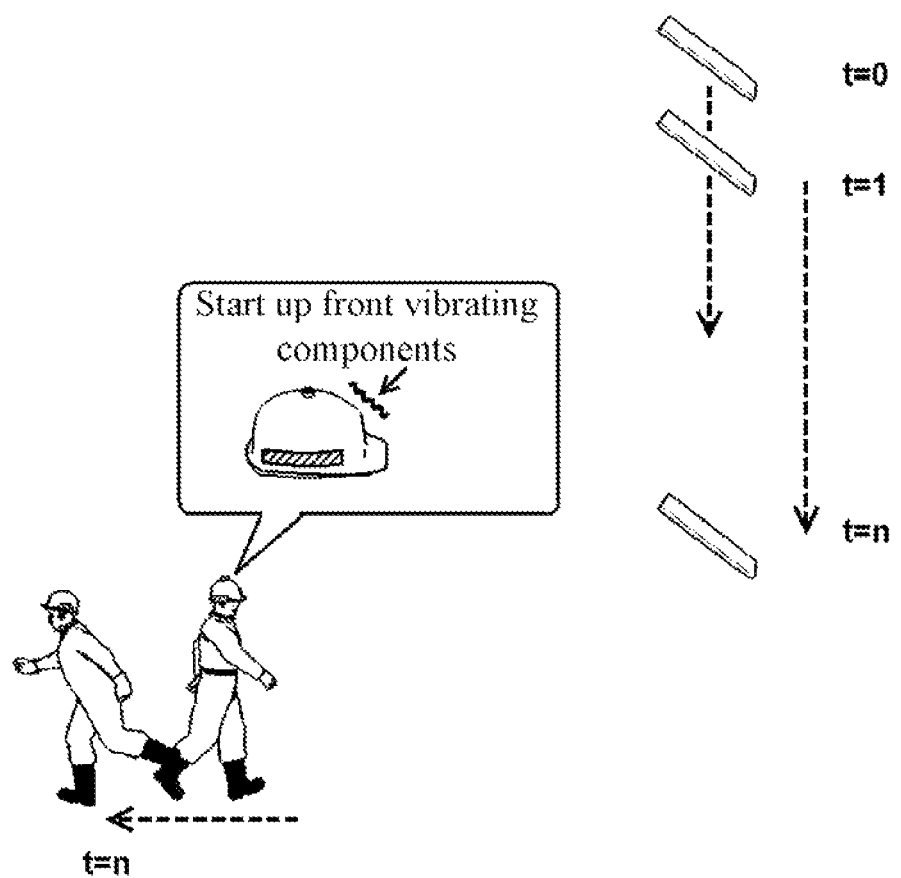

In block S15, the alarm message generation module 218 outputs alarm messages by enabling the determined alarm units 26 (e.g., the front vibrating components 262), to warn the user (see FIG. 7B).

In this embodiment, if the signal lamp 260 and the front vibrating components 262 are enabled, it is an indication that the user is in danger. The user may stop walking or just look up. In one embodiment, the signal lamp 260 outputs the alarm messages by outputting alarm light.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for detecting a falling object using a safety guard device, the method comprising:
   obtaining a current digital image captured by an image capturing device of the safety guard device, and obtaining a movement direction and a movement speed of a user of the safety guard device detected by an acceleration sensor of the safety guard device;
   detecting a falling object in the current digital image, the current digital image comprising distance information between a lens of the image capturing device and each point in the current digital image;
   determining whether a detected falling object is in proximity to the user of the safety guard device according to a position of the detected falling object, the movement direction and the movement speed of the user; and
   outputting alarm messages by enabling one or more alarm units of the safety guard device upon the condition that the detected falling object is in proximity to the user of the safety guard device.

2. The method according to claim 1, further comprising: enabling one or more alarm units according to a relative position between the user of the safety guard device and the detected falling object.

3. The method according to claim 1, wherein the falling object is detected by:
   obtaining a previous digital image captured by the image capturing device, comparing a current distance of each point in the current digital image with a previous distance of each point in the previous digital image, and determining whether the current distance is less than the previous distance; and
   determining that the current digital image comprises the falling object upon the condition that a specified number of points whose current distances are less than the previous distances are found.

4. The method according to claim 3, wherein the falling object is determined by calculating a smallest rectangle framing the specified number of points, or determined by fitting the specified number of points into a fitted figure using a feature point fitting method.

5. The method according to claim 1, wherein the step of determining whether a detected falling object is in proximity to the user comprises:
   calculating a falling distance from the detected falling object to the safety guard device according to a distance between the detected falling object and the lens of the image capturing device;
   determining a falling range of the detected falling object according to the falling distance, the falling range comprising a horizontal coordinate range and a vertical coordinate range of the detected falling object, and determining a horizontal direction to be the movement direction of the user;
   determining an alarm range according to the falling range of the detected falling object, and determining a user range according a current position of the user; and
   determining that the detected falling object is going to hit the user of the safety guard device upon the condition that the user range and the alarm range have at least one intersection point.

6. The method according to claim 1, wherein the step of determining whether a detected falling object is in proximity to the user comprises:
    calculating a falling distance from the detected falling object to the safety guard device according to a distance between the detected falling object and the lens of the image capturing device;
    calculating a horizontal distance between the user of the safety guard device and the detected falling object along a horizontal direction, the horizontal direction being the movement direction of the user;
    calculating a falling time of the detected falling object according to the falling distance of the detected falling object;
    determining a movement distance of the user within the falling time according to the movement speed of the user; and
    determining that the detected falling object is going to hit the user of the safety guard device upon the condition that the movement distance plus a preset value is greater than the horizontal distance.

7. A safety guard device, comprising:
    a storage device;
    an image capturing device;
    an acceleration sensor;
    at least one processor; and
    one or more modules that are stored in the storage device and are executed by the at least one processor, the one or more modules comprising:
        an image obtaining module that obtains a current digital image captured by the image capturing device, and obtains a movement direction and a movement speed of a user of the safety guard device detected by the acceleration sensor;
        an object detection module that detects a falling object in the current digital image, the current digital image comprising distance information between a lens of the image capturing device and each point in the current digital image;
        a safety analysis module that determines whether a detected falling object is in proximity to the user of the safety guard device according to a position of the detected falling object, the movement direction and the movement speed of the user; and
        an alarm message generation module that outputs alarm messages by enabling one or more alarm units of the safety guard device upon the condition that the detected falling object is in proximity to the user of the safety guard device.

8. The safety guard device according to claim 7, wherein the one or more modules further comprise:
    an alarm unit determination module that enabling one or more alarm units according to a relative position between the user of the safety guard device and the detected falling object.

9. The safety guard device according to claim 7, wherein the falling object is detected by:
    obtaining a previous digital image captured by the image capturing device, comparing a current distance of each point in the current digital image with a previous distance of each point in the previous digital image, and determining whether the current distance is less than the previous distance; and
    determining that the current digital image comprises the falling object upon the condition that a specified number of points whose current distances are less than the previous distances are found.

10. The safety guard device according to claim 9, wherein the falling object is determined by calculating a smallest rectangle framing the specified number of points, or determined by fitting the specified number of points into a fitted figure using a feature point fitting method.

11. The safety guard device according to claim 7, wherein the safety analysis module determines whether a detected falling object is in proximity to the user by:
    calculating a falling distance from the detected falling object to the safety guard device according to a distance between the detected falling object and the lens of the image capturing device;
    determining a falling range of the detected falling object according to the falling distance, the falling range comprising a horizontal coordinate range and a vertical coordinate range of the detected falling object, and determining a horizontal direction to be the movement direction of the user;
    determining an alarm range according to the falling range of the detected falling object, and determining a user range according a current position of the user; and
    determining that the detected falling object is going to hit the user of the safety guard device upon the condition that the user range and the alarm range have at least one intersection point.

12. The safety analysis module according to claim 7, wherein the safety analysis module determines whether a detected falling object is in proximity to the user by:
    calculating a falling distance from the detected falling object to the safety guard device according to a distance between the detected falling object and the lens of the image capturing device;
    calculating a horizontal distance between the user of the safety guard device and the detected falling object along a horizontal direction, the horizontal direction being the movement direction of the user;
    calculating a falling time of the detected falling object according to the falling distance of the detected falling object;
    determining a movement distance of the user within the falling time according to the movement speed of the user; and
    determining that the detected falling object is going to hit the user of the safety guard device upon the condition that the movement distance plus a preset value is greater than the horizontal distance.

13. A non-transitory storage medium having stored thereon instructions that, when executed by a processor of a safety guard device, causes the safety guard device to perform a method for detecting a falling object, the method comprising:
    obtaining a current digital image captured by an image capturing device of the safety guard device, and obtaining a movement direction and a movement speed of a user of the safety guard device detected by an acceleration sensor of the safety guard device;
    detecting a falling object in the current digital image, the current digital image comprising distance information between a lens of the image capturing device and each point in the current digital image;
    determining whether a detected falling object is in proximity to the user of the safety guard device according to a position of the detected falling object, the movement direction and the movement speed of the user; and
    outputting alarm messages by enabling one or more alarm units of the safety guard device upon the condition that the detected falling object is in proximity to the user of the safety guard device.

14. The non-transitory storage medium according to claim 13, wherein the method further comprises: enabling one or more alarm units according to a relative position between the user of the safety guard device and the detected falling object.

15. The non-transitory storage medium according to claim 13, wherein the falling object is detected by:

obtaining a previous digital image captured by the image capturing device, comparing a current distance of each point in the current digital image with a previous distance of each point in the previous digital image, and determining whether the current distance is less than the previous distance; and determining that the current digital image comprises the falling object upon the condition that a specified number of points whose current distances are less than the previous distances are found.

16. The non-transitory storage medium according to claim 15, wherein the falling object is determined by calculating a smallest rectangle framing the specified number of points, or determined by fitting the specified number of points into a fitted figure using a feature point fitting method.

17. The non-transitory storage medium according to claim 13, wherein the step of determining whether a detected falling object is in proximity to the user comprises:

calculating a falling distance from the detected falling object to the safety guard device according to a distance between the detected falling object and the lens of the image capturing device;

determining a falling range of the detected falling object according to the falling distance, the falling range comprising a horizontal coordinate range and a vertical coordinate range of the detected falling object, and determining a horizontal direction to be the movement direction of the user;

determining an alarm range according to the falling range of the detected falling object, and determining a user range according a current position of the user; and determining that the detected falling object is going to hit the user of the safety guard device upon the condition that the user range and the alarm range have at least one intersection point.

18. The non-transitory storage medium according to claim 13, wherein the step of determining whether a detected falling object is in proximity to the user comprises:

calculating a falling distance from the detected falling object to the safety guard device according to a distance between the detected falling object and the lens of the image capturing device;

calculating a horizontal distance between the user of the safety guard device and the detected falling object along a horizontal direction, the horizontal direction being the movement direction of the user;

calculating a falling time of the detected falling object according to the falling distance of the detected falling object;

determining a movement distance of the user within the falling time according to the movement speed of the user; and determining that the detected falling object is going to hit the user of the safety guard device upon the condition that the movement distance plus a preset value is greater than the horizontal distance.

\* \* \* \* \*